United States Patent
Ogoe et al.

(10) Patent No.: US 10,267,361 B2
(45) Date of Patent: *Apr. 23, 2019

(54) SLIDING CONTACT SURFACE-FORMING MATERIAL, AND MULTI-LAYERED SLIDING CONTACT COMPONENT HAVING THE SAME

(75) Inventors: Hiroyuki Ogoe, Kanagawa (JP); Shinya Nishimura, Kanagawa (JP); Kentaro Okubo, Kanagawa (JP)

(73) Assignee: Oiles Corporation, Tokyo (JP)

(*) Notice: Subject to any disclaimer, the term of this patent is extended or adjusted under 35 U.S.C. 154(b) by 367 days.

This patent is subject to a terminal disclaimer.

(21) Appl. No.: 13/496,928

(22) PCT Filed: Jul. 14, 2010

(86) PCT No.: PCT/JP2010/004564
§ 371 (c)(1),
(2), (4) Date: Mar. 19, 2012

(87) PCT Pub. No.: WO2011/039917
PCT Pub. Date: Apr. 7, 2011

(65) Prior Publication Data
US 2012/0178328 A1   Jul. 12, 2012

(30) Foreign Application Priority Data
Sep. 30, 2009  (JP) ................. 2009-228606

(51) Int. Cl.
*B32B 5/02*  (2006.01)
*F16C 33/20*  (2006.01)
(Continued)

(52) U.S. Cl.
CPC ............. *F16C 33/201* (2013.01); *C08J 5/048* (2013.01); *F16C 17/02* (2013.01); *F16C 33/203* (2013.01);
(Continued)

(58) Field of Classification Search
CPC ..... C08J 5/04; C08J 5/046; C08J 5/047; C08J 5/048; F16C 17/00–17/035; F16C 33/201; F16C 33/203–33/206; D02G 3/28
(Continued)

(56) References Cited

U.S. PATENT DOCUMENTS 5,631,085 A *  5/1997  Gebauer ................ 428/377
7,226,213 B2 *  6/2007  Roos et al. ............ 384/298
2012/0178327 A1*  7/2012  Ogoe et al. ........... 442/172

FOREIGN PATENT DOCUMENTS

JP   S39-14852 Y   7/1964
JP   S43-27504 A   11/1972
(Continued)

OTHER PUBLICATIONS

Lawrence, Fundamentals of Spun Yarn Technology, CRC Press, 2003, 47-48.*
(Continued)

*Primary Examiner* — Jeremy R Pierce
(74) *Attorney, Agent, or Firm* — Carrier Blackman & Associates, P.C.; William D. Blackman; Joseph P. Carrier

(57) ABSTRACT

A sliding contact surface-forming material includes a reinforcing base impregnated with a resol-type phenolic resin having polytetrafluoroethylene resin dispersed therein. The reinforcing base is composed of a woven fabric formed by using, respectively as the warp and the weft, a ply yarn which is formed by paralleling at least two strands of a single twist yarn spun from fluorine-containing resin fiber and a single twist yarn spun from polyphenylene sulfide fiber, and by twisting them in the direction opposite to the direction in which the single twist yarns were spun. Also, a multi-layered sliding contact component having the overall shape of a flat plate or a circular cylinder includes the sliding
(Continued)

contact surface-forming material so as to configure at least the sliding-contact surface thereof.

13 Claims, 6 Drawing Sheets

(51) Int. Cl.
*C08J 5/04* (2006.01)
*F16C 17/02* (2006.01)

(52) U.S. Cl.
CPC ......... *F16C 33/208* (2013.01); *C08J 2361/12* (2013.01); *F16C 2208/02* (2013.01); *F16C 2240/60* (2013.01); *Y10T 442/2926* (2015.04)

(58) Field of Classification Search
USPC ......... 57/200, 204, 236, 237, 241, 243, 244, 57/258; 442/217, 218, 59, 71, 72, 73, 74, 442/75, 97, 98, 101, 170, 171, 181, 189, 442/197
See application file for complete search history.

(56) References Cited

FOREIGN PATENT DOCUMENTS

| JP | 04-225037 A | | 8/1992 |
|---|---|---|---|
| JP | 2009-091446 A | | 4/2009 |
| JP | 2009091446 A | * | 4/2009 |
| JP | 2009-103193 A | | 5/2009 |
| JP | 2009103193 A | * | 5/2009 |
| JP | 2010-120992 A | | 6/2010 |

OTHER PUBLICATIONS

Chawla, Fibrous Materials, Cambridge University Press, 1998, 13.*
Harnoy, Bearing Design in Machinery, CRC Press, 2002, chapter 11.*
Hearle, High-Performance Fibres, CRC Press, 2000, 274-277.*
Human Translation of JP 2009-103193A, May 14, 2009, pp. 1-34.*
Human Translation of JP 2009-091446A, Apr. 30, 2009, pp. 1-47.*

* cited by examiner

SLIDING CONTACT SURFACE-FORMING MATERIAL, AND MULTI-LAYERED SLIDING CONTACT COMPONENT HAVING THE SAME

TECHNICAL FIELD

The present invention relates to a sliding contact surface-forming material used for sliding contact components such as slide bearing, and a multi-layered sliding contact component having the sliding contact surface-forming material for the sliding contact surface thereof.

BACKGROUND ART

There have been known a fiber-reinforced resin composition configured by impregnating a phenolic resin into cotton fabric used as a reinforcing base, or a fiber-reinforced resin composition configured by impregnating a resin composition, which is composed of a phenolic resin and polytetrafluoroethylene resin added thereto, into cotton fabric used as a reinforcing base (Patent Document 1). A multi-layered sliding contact component, configured by laminating the fiber-reinforced resin composition into a flat or circular cylindrical geometry, is excellent in wear resistance and load resistance, and also in rigidity. The sliding contact components are adopted to wear ring fitted to the outer circumferential surface of piston of hydraulic cylinder, underwater slide bearing and so forth. The phenolic resin exhibits superior performances under water lubrication, supposedly ascribable to the surface characteristics thereof. More specifically, possible reasons include readiness of adsorption of water to the cotton fabric used as the base, and good affinity of OH group of the phenolic resin with water.

The circular cylindrical multi-layered sliding contact component manufactured using the fiber-reinforced resin composition composed of the cotton fabric and the phenolic resin has, however, been facing difficulty in keeping a constant clearance (gap of sliding contact) with respect to the opposing shaft, due to swelling when used in a humid atmosphere or underwater. Such swelling of the circular cylindrical multi-layered sliding contact component is mainly ascribable to high water absorptivity of the cotton fabric used as the reinforcing base. Accordingly, low-water-absorptive synthetic fiber fabrics, composed of polyester fiber, polyacrylonitrile fiber and so forth, have attracted public attention as reinforcing bases other than the cotton fabric, intended for underwater applications. The synthetic resins having these advantages, however, still in need of improvement in adhesiveness to resins to be adopted, when used as the reinforcing base.

Patent Document 2 discloses a fiber-reinforced resin composition configured by using, as a reinforcing base, a woven fabric made of polyamide fiber, polyester fiber, polyacrylonitrile fiber or carbon fiber, and impregnated with a thermosetting synthetic resin such as phenolic resin added with fluorine-containing polymer, melamine resin, epoxy resin or alkyd resin, and a slide bearing using the same. It is also disclosed that, in order to improve the adhesiveness between these synthetic fibers and the synthetic resins, the synthetic resins are added with co-condensation products of polyamide and polyvinyl alcohol derivatives, as adhesion enhancers.

Patent Document 3 discloses a reinforced plastic plate configured by stacking sheets of polyester fiber woven fabric, used as reinforcing bases, after being impregnated with an unsaturated polyester resin. It is, however, difficult to adhere the intact polyester fiber to the unsaturated polyester resin, due to a poor content of functional groups in the polyester fiber. The Patent Document 3 therefore describes that, in order to improve the adhesiveness, or affinity, of the fiber with the resin, the polyester fiber is annealed with a bisphenol-based epoxy resin in an organic solvent, at a temperature of 150° C. or below for 5 to 120 minutes.

PRIOR ART DOCUMENT

Patent Document

Patent Document 1: Japanese Examined Patent Publication No. S39-14852
Patent Document 2: Japanese Laid-Open Patent Publication No. H04-225037
Patent Document 3: Japanese Examined Patent Publication No. S43-27504

DISCLOSURE OF THE INVENTION

Problems to be Solved by the Invention

While the polyester fiber is advantageous in that it does not swell when used as the reinforcing fiber for sliding contact component by virtue of its low water absorptivity, but is in need of improving the adhesiveness to the resin, in view of expressing an effect of reinforcing the resin. In addition, the polyester resin used as a reinforcing material used under dry frictional conditions has been suffering from lack of heat resistance. It was not durable under an atmosphere typically having a temperature of exceeding 250° C., and is therefore difficult to be adopted to applications where heat resistance is required.

Considering the above-described situation, the present applicant have got an idea of using, as the reinforcing fiber, polyphenylene sulfide fiber which is known to have an extremely small water absorption and high heat resistance, and previously proposed a fiber-reinforced resin composition for configuring sliding contact component, which is composed of a woven fabric made of polyphenylene sulfide fiber, impregnated with a specific resol-type phenolic resin having polytetrafluoroethylene resin dispersed therein, and a multi-layered sliding contact component manufactured by using the fiber-reinforced resin composition for configuring sliding contact component (Japanese Laid-Open Patent Publication No. 2008-293692).

The multi-layered sliding contact component proposed previously was capable of achieving a sufficient level of adhesiveness to the specific resol-type phenolic resin without needing any surface treatment of the fabric, high in the rigidity, excellent in the mechanical strength, small in the amount of swelling even if used under highly-humid atmosphere or under water, excellent in the friction-proof and wear-proof characteristics under dry frictional conditions, grease lubricating conditions, and water lubricating conditions, and was expected to be adoptable to a wide variety of applications.

Even for the proposed multi-layered sliding contact component expected to be adoptable to a wide variety of applications, there was, however, still the room for improvement particularly in the friction-proof and wear-proof characteristics under oscillating conditions for testing journals under dry frictional conditions such as in the air.

The present invention relates to improvement of the invention disclosed in Japanese Laid-Open Patent Publication No. 2008-293692, and an object of which is to provide a sliding contact surface-forming material improved in the friction-proof, wear-proof characteristics under dry frictional conditions such as in the air, while keeping the advantages of the sliding contact component disclosed in Japanese Laid-Open Patent Publication No. 2008-293692 unchanged, that is, while keeping the low swelling, friction-proof, and wear-proof characteristics under moist atmosphere typically under water unchanged, and also is to provide a multi-layered sliding contact component having the sliding contact surface-forming material so as to configure the sliding-contact surface thereof.

Means for Solving the Problems

According to the present invention, there is provided a sliding contact surface-forming material which includes a reinforcing base impregnated with a resol-type phenolic resin having a polytetrafluoroethylene resin powder dispersed therein. The reinforcing base is composed of a woven fabric formed by using, respectively as the warp and the weft, a ply yarn which is formed by paralleling at least two strands of a single twist yarn spun from fluorine-containing resin fiber and a single twist yarn spun from polyphenylene sulfide (referred to as "PPS", hereinafter) fiber, and by twisting them in the direction opposite to the direction in which the single twist yarns were spun.

The fluorine-containing resin fiber adoptable herein may be selected from polytetrafluoroethylene (referred to as "PTFE", hereinafter) fiber, tetrafluoroethylene-perfluoroalkyl vinyl ether copolymer (referred to as "PFA", hereinafter) fiber, tetrafluoroethylene-hexafluoropropylene copolymer (referred to as "FEP", hereinafter) fiber and ethylene-tetrafluoroethylene copolymer (referred to as "ETFE", hereinafter) fiber. For the case where a particularly high heat resistance is necessary in applications of sliding contact component, PTFE fiber is preferably selected.

The single twist yarn spun from fluorine-containing resin fiber, used for configuring the reinforcing base, is preferably a yarn of at least 400 denier, and the single twist yarn spun from PPS fiber, used for configuring the reinforcing base, is preferably a yarn having at least No. 20 cotton count.

The single twist yarns spun from fluorine-containing resin fiber and from PPS fiber are preferably lower-twisted (Z-twisted) yarns, and each of the single twist yarn spun from fluorine-containing resin fiber and the single twist yarn spun from PPS fiber preferably has a twist count of 260 to 300 T/m.

The ply yarn, which is formed by paralleling at least two strands of a single twist yarn spun from fluorine-containing resin fiber and a single twist yarn spun from PPS fiber, and by twisting them in the direction (S-direction) opposite to the direction in which the single twist yarns were spun, preferably has a twist count of 255 to 295 T/m.

The woven fabric, as the reinforcing base, formed by weaving the ply yarn is preferably a flat-woven fabric preferably having a density of 36 to 44 ends/inch for the warp (vertical yarn), and 36 to 44 picks/inch for the weft (horizontal yarn).

The sliding contact surface-forming material of the present invention preferably contains 35 to 50% by weight of the resol-type phenolic resin, 10 to 30% by weight of the PTFE, and 35 to 50% by weight of the reinforcing base (where, the contents of the three components totals 100% by weight).

The resol-type phenolic resin composing the sliding contact surface-forming material is preferably synthesized by allowing a phenolic compound which contains 50 to 100 mol % of bisphenol A to react with a formaldehyde compound, while being catalyzed by an amine compound, has a number-average molecular weight Mn, measured by gel permeation chromatography (GPC), of 500 to 1000, and has a dispersion index Mw/Mn, given as a ratio of weight-average molecular weight Mw and number-average molecular weight Mn, of 2.5 to 15.

The PTFE powder contained in the resol-type phenolic resin while being dispersed therein is preferably either of a high-molecular-weight polytetrafluoroethylene resin having a molecular weight of several millions to several tens of millions, or a low-molecular-weight polytetrafluoroethylene resin having a molecular weight of several thousands to several hundreds of thousands.

A multi-layered sliding contact component of the present invention has the overall shape of a flat plate and has the above-described sliding contact surface-forming material so as to integrally configure typically at least the sliding-contact surface of a square metal backing made of a fiber-reinforced synthetic resin; or has the overall shape of a circular cylinder and has the above-described sliding contact surface-forming material so as to integrally configure typically at least the sliding-contact surface of a circular cylindrical metal backing made of a fiber-reinforced synthetic resin.

Effect of the Invention

Since the reinforcing base, which is composed of a woven fabric formed by using, respectively as the warp and the weft, a ply yarn formed by paralleling at least two strands of a single twist yarn spun from fluorine-containing resin fiber and a single twist yarn spun from PPS fiber, and by twisting them in the direction opposite to the direction in which the single twist yarns were spun, allows the fluorine-containing resin fiber and the PPS fiber to expose on at least one surface thereof which serves as the sliding contact surface, while keeping almost equal areas of exposure, so that the present invention successfully provides a sliding contact surface-forming material, improved in the friction-proof and wear-proof characteristics, contributed also by low friction properties of the PTFE impregnated into the reinforcing base.

Since the woven fabric as the reinforcing base, woven using the ply yarn as the warp and the weft, may be made thicker than a flat-woven fabric typically woven by using single twist yarn as the warp and the weft, so that the multi-layered sliding contact component, integrally having the sliding contact surface-forming material configured by impregnating a specific resol-type phenolic resin which contains PTFE dispersed therein into the reinforcing base, may be subjected to machining, and thereby dimensional accuracy of the multi-layered sliding contact component may be improved.

The resol-type phenolic resin preferably used in the present invention is synthesized by allowing a phenolic compound which contains 50 to 100 mol % of bisphenol A to react with a formaldehyde compound, while being catalyzed by an amine compound, has a number-average molecular weight Mn, measured by gel permeation chromatography (GPC), of 500 to 1000, and has a dispersion index Mw/Mn, given as a ratio of weight-average molecular weight Mw and number-average molecular weight Mn, of 2.5 to 15. The phenolic resin is dramatically improved in the affinity with the PPS fiber, so that it may thoroughly be impregnated into the flat-woven fabric, and may therefore tightly adhere to the woven fabric. Accordingly, the surface treatment of the woven fabric containing PPS fiber, which has been necessary in the prior art, is no longer necessary.

DESCRIPTION OF EMBODIMENTS

The sliding contact surface-forming material, and the multi-layered sliding contact component using the sliding contact surface-forming material of the present invention will be detailed below.

The sliding contact surface-forming material of the present invention is configured by a reinforcing base impregnated with a resol-type phenolic resin having PTFE dispersed therein, wherein the reinforcing base is composed of a woven fabric formed by using, respectively as the warp (vertical yarn) and the weft (horizontal yarn), a ply yarn which is formed by paralleling at least two strands of a single twist yarn spun from fluorine-containing resin fiber and a single twist yarn spun from PPS fiber, and by twisting them in the direction opposite to the direction in which the single twist yarns were spun.

In the present invention, PTFE fiber, PFA fiber, FEP fiber, ETFE fiber and so forth may be selected and used as the fluorine-containing resin fiber. Among them, PTFE fiber having a good heat resistance (melting point=327° C.) is particularly preferable for applications of the multi-layered sliding contact component in which heat resistance is required. The fluorine-containing resin fibers may be formed in both forms of spun yarn and filament yarn, wherein the spun yarn is preferable.

The single twist yarn spun from fluorine-containing resin fiber is a spun yarn or a filament yarn formed by lower-twisting (Z-twisting) of filament yarn or spun yarn of at least 400 denier, more preferably spun yarn, at 260 to 300 T/m.

PPS fiber is spun by a general melt spinning process from a PPS polymer represented by a formula (Ar—S), where Ar represents an aromatic group exemplified by phenylene group, biphenylene group, biphenylene ether group, naphthalene group and so forth. The PPS fiber has excellent properties including heat resistance, anti-oxidation property, heat resistance and chemical resistance. In particular, the heat resistance is excellent enough to endure through continuous use at 190° C. The PPS fiber is low in the hygroscopicity and water absorbency, showing a water content of 0.2%.

Specific examples of the PPS fiber adoptable to the present invention include "Torcon (trade name)" from Toray Industries, Inc., and "Procon (trade name)" from Toyobo Co., Ltd. The single twist yarn of PPS fiber is preferably formed by lower-twisting (Z-twisting) a filament yarn or spun yarn, more preferably spun yarn, having a cotton count of at least No. 20 (in denier, approximately 265 denier), at 260 to 300 T/m.

In the present invention, the ply yarn is formed by paralleling at least two strands, wherein one is a single twist yarn composed of a spun yarn or filament yarn spun from fluorine-containing resin fiber, and the other is a single twist yarn composed of a spun yarn or filament yarn spun from PPS fiber, and by twisting them in the direction (S-twisting) opposite to the direction (Z-twisting) in which the single twist yarns were spun.

Figure 10:
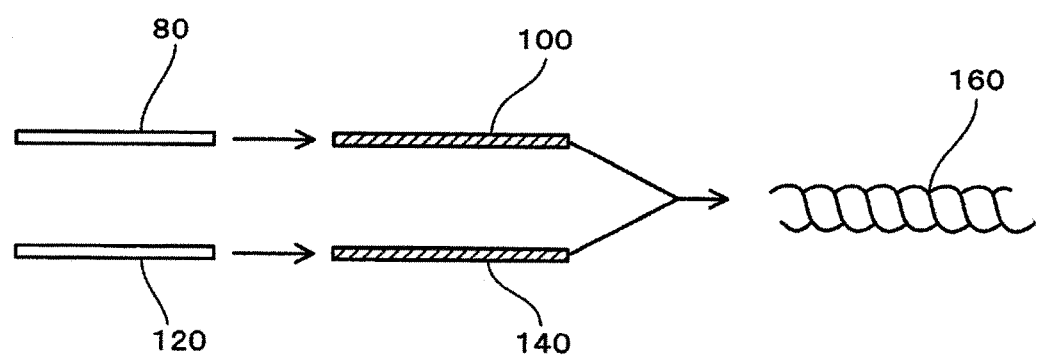
FIG. 10 is a drawing illustrating an exemplary method of manufacturing a ply yarn.

FIG. 10 is a drawing for explaining an exemplary method of manufacturing the ply yarn. Referring to FIG. 10, a single yarn 80 of fiber "A" is twisted to produce a single twist yarn 100 of fiber "A". Separately, a single yarn 120 of fiber "B" is twisted to produce a single twist yarn 140 of fiber "B". The single twist yarn 100 of fiber "A" and the single twist yarn 140 of fiber "B" are paralleled, and then twisted in the direction opposite to the direction in which the single twist yarns 100, 140 were spun, to thereby form a ply yarn 160.

A woven fabric which serves as the reinforcing base may be formed by weaving the ply yarn used as the warp (vertical yarn) and the weft (horizontal yarn). The flat-woven fabric which serves as the reinforcing base having a density of 36 to 44 ends/inch for the vertical yarn (warp), and a density of 36 to 44 picks/inch for the horizontal yarn (weft), may preferably be used as the reinforcing base. Since the flat-woven fabric used as the reinforcing base allows the fluorine-containing resin fiber and the PPS fiber to expose on at least one surface thereof which serves as the sliding contact surface, while keeping almost equal areas of exposure, so that the flat-woven fabric successfully provides a sliding contact surface-forming material, improved in the friction-proof and wear-proof characteristics, contributed also by low friction properties of the PTFE powder impregnated into the fabric. Even if the woven fabric is machined, the fluorine-containing resin fiber and the PPS fiber expose in nearly equal areas on the surface which serves as the sliding contact surface, so that the friction-proof and wear-proof characteristics of the reinforcing base may be maintained over a long period.

The woven fabric woven, as the reinforcing base, using the ply yarn as the warp and the weft thereof may be thickened. The possibility of thickening allows machine processing of the sliding contact surface of the multi-layered sliding contact component which has, as integrally provided to the sliding contact surface thereof, the sliding contact surface-forming material, the woven fabric of which is impregnated with a specific resol-type phenolic resin having PTFE dispersed therein. Accordingly, dimensional accuracy of the multi-layered sliding contact component may successfully be improved.

An appropriate amount of the reinforcing base, contained in the sliding contact surface-forming material of the present invention, is 35 to 50% by weight. The amount of reinforcing base less than 35% by weight may fail in fully expressing the friction-proof and wear-proof characteristics, whereas the amount exceeding 50% by weight may reduce the amount of resol-type phenolic resin described later, and may therefore considerably degrade the moldability.

In the present invention, the resol-type phenolic resin is synthesized by allowing a phenolic compound containing 50 to 100 mol % of bisphenol A to react with a formaldehyde compound, while being catalyzed by an amine compound. The resol-type phenolic resin preferably has a number-average molecular weight Mn, measured by GPC, of 500 to 1000, and has a dispersion index Mw/Mn, given as a ratio of weight-average molecular weight Mw and number-average molecular weight Mn, of 2.5 to 15.

As described in the above, the resol-type phenolic resin used in the present invention preferably has a ratio of bisphenol A ($C_{15}H_{16}O_2$) in the phenolic compound of 50 to 100 mol %. The ratio herein represents a ratio of molarity of bisphenol A relative to the total molarity of all phenolic compounds charged at the start of synthesis.

The thus-synthesized, resol-type phenolic resin preferably has a number-average molecular weight Mn, measured by GPC, of 500 to 1000, and a dispersion index Mw/Mn of molecular weight distribution of 2.5 to 15. The resol-type phenolic resin is distinctively increased in the affinity to the woven fabric as the reinforcing base. Accordingly, the sliding contact surface-forming material having good adhesiveness with the woven fabric may be obtained, without subjecting the woven fabric to any processing such as surface treatment.

The resol-type phenolic resin having a bisphenol A content of less than 50 mol % may fail in obtaining a sufficient level of affinity to the reinforcing base, and may thereby fail in obtaining a sufficient level of adhesiveness with the reinforcing base. The resol-type phenolic resin also preferably has a number-average molecular weight Mn, measured by GPC, of 500 to 1000, and has a dispersion index Mw/Mn of 2.5 to 15. The number-average molecular weight Mn smaller than 500 may induce degradation in the mechanical strength despite its desirable affinity with the reinforcing base, whereas the number-average molecular weight Mn exceeding 1000 may excessively elevates the viscosity of the resol-type phenolic resin, and may make the resin difficult to impregnate into the reinforcing base. The dispersion index Mw/Mn of smaller than 2.5 may fail in obtaining a sufficient level of adhesiveness with the reinforcing base, whereas the dispersion index Mw/Mn exceeding 15 may make the resin difficult to impregnate into the reinforcing base, similarly to the case where the number-average molecular weight Mn exceeds 1000.

Accordingly, the resol-type phenolic resin to be impregnated into the reinforcing base is now successful to ensure sufficient levels of readiness of impregnation and adhesiveness with respect to the reinforcing base, and the mechanical strength of the sliding contact surface-forming material, by adjusting the molar ratio of bisphenol A in the phenolic compound, and number-average molecular weight Mn and dispersion index Mw/Mn measurable by GPC, to the above-described ranges.

For the case where the ratio of bisphenol A in the phenolic compound is less than 100 mol %, phenol compound other than bisphenol A is contained as a matter of course. The phenolic compound other than bisphenol A is exemplified by phenol, cresol, ethylphenol, aminophenol, resolcinol, xylenol, butylphenol, trimethylphenol, catechol, and phenylphenol. Among them, phenol is preferably used by virtue of its characteristics. The phenolic compounds other than bisphenol A may be used independently, or as a mixture of two or more species.

The formaldehyde compound is exemplified by formalin, paraformaldehyde, salicylaldehyde, benzaldehyde, and p-hydroxybenzaldehyde. In particular, formalin and paraformaldehyde are preferably used in view of readiness of synthesis. The formaldehyde compounds may be used independently, or as a mixture of two or more species.

The amines used as the catalyst is exemplified by triethylamine, triethanolamine, benzyldimethylamine, and aqueous ammonia. Among them, triethylamine and aqueous ammonia are preferably used in view of readiness of synthesis.

The content of resol-type phenolic resin contained in the sliding contact surface-forming material of the present invention is preferably 35 to 50% by weight. The content of resol-type phenolic resin less than 35% by weight may adversely affect the moldability (manufacturing) of the sliding contact surface-forming material, whereas the content exceeding 50% by weight may degrade the mechanical strength of the sliding contact surface-forming material.

The PTFE powder to be mixed to the resol-type phenolic resin may be either of molding powder (abbreviated as "high-molecular-weight PTFE", hereinafter) for molding, and PTFE (abbreviated as "low-molecular-weight PTFE", hereinafter) having the molecular weight reduced from that of the high-molecular-weight PTFE typically by irradiation. The low-molecular-weight PTFE is typically used as an additive, readily crushable, and highly dispersible.

Specific examples of the high-molecular-weight PTFE include "Teflon (registered trademark) 7-J", "Teflon (registered trademark) 7A-J", "Teflon (registered trademark) 70-J", etc. from Du Pont-Mitsui Fluorochemicals Co., Ltd.; "Polyflon M-12 (trade name)" etc. from Daikin Industries, Ltd.; and "Fluon G163 (trade name)", "Fluon G190 (trade name)", etc. from Asahi Glass Co., Ltd.

Specific examples of the low-molecular-weight PTFE include "TLP-10F (trade name)" etc. from Du Pont-Mitsui Fluorochemicals Co., Ltd.; "Lubron L-5 (trade name)" etc. from Daikin Industries, Ltd.; "Fluon L150J (trade name)", "Fluon L169J (trade name)", etc. from Asahi Glass Co., Ltd.; and "KTL-8N (trade name)", "KTL-2N (trade name)", etc. from Kitamura Ltd.

While both of high-molecular-weight PTFE and low-molecular-weight PTFE may be adoptable to the present invention, powder of low-molecular-weight PTFE is preferable, in view of uniform dispersion and suppression of void formation when mixed with the resol-type phenolic resin. The average particle size of the PTFE powder is preferably 1 to 50 μm, and more preferably 1 to 30 μm, in view of ensuring uniform dispersion and preventing voids from being formed.

An appropriate amount of PTFE contained in the sliding contact surface-forming material is 10 to 30% by weight. The amount of PTFE less than 10% by weight may fail in effectively improving the friction-proof and wear-proof characteristics, whereas the amount exceeding 30% by weight may increase the viscosity of resin in the process of molding, may form voids, may reduce adhesiveness of the resol-type phenolic resin, may reduce the strength of the sliding contact surface-forming material or the multi-layered sliding contact component, and may thereby induce separation between the layers.

As is understood from the explanation in the above, the sliding contact surface-forming material of the present invention is composed of 35 to 50% by weight of woven fabric as the reinforcing base which is composed of a woven fabric formed by using, respectively as the warp (vertical yarn) and the weft (horizontal yarn), a ply yarn formed by a single twist yarn spun from fluorine-containing resin fiber and a single twist yarn spun from PPS fiber, 10 to 30% by weight of PTFE, and 35 to 50% by weight of resol-type phenolic resin. The sliding contact surface-forming material is excellent in all of moldability, mechanical strength, and friction-proof and wear-proof characteristics.

Next, the sliding contact surface-forming material and the multi-layered sliding contact component using the sliding contact surface-forming material will be explained referring to the attached drawings which illustrate preferred examples.

<Sliding Contact Surface-Forming Material>

Figure 1:
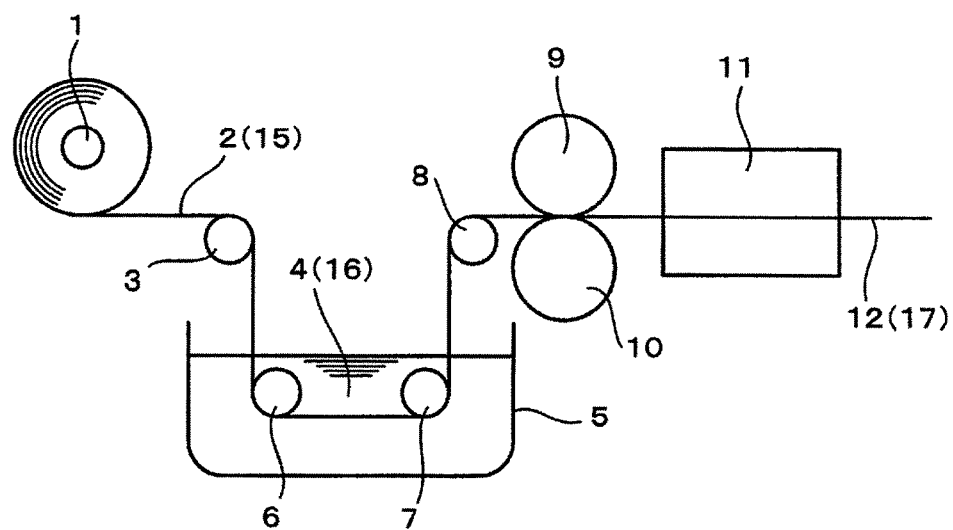
FIG. 1 is a drawing for explaining an apparatus for manufacturing a prepreg for configuring the sliding contact surface-forming material.
Figure 2:
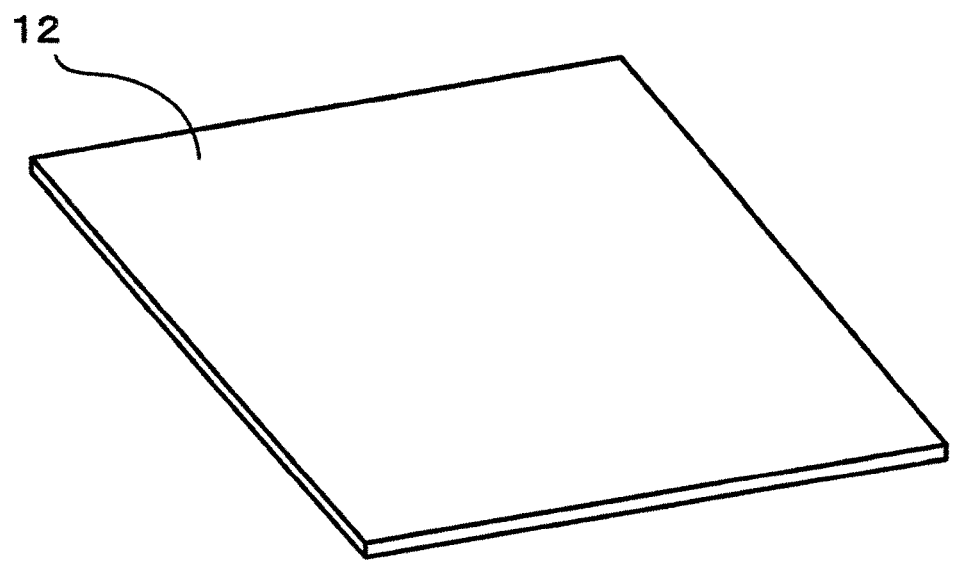
FIG. 2 is a perspective view illustrating the prepreg for configuring the sliding contact surface-forming material.

FIG. 1 is a drawing schematically illustrating an exemplary method of manufacturing a prepreg (resin base) for configuring the sliding contact surface-forming material. In a manufacturing apparatus illustrated in FIG. 1, a reinforcing base 2 which is composed of a woven fabric formed by using, respectively as the warp (vertical yarn) and the weft (horizontal yarn), a ply yarn composed of a single twist yarn spun from fluorine-containing resin fiber and a single twist yarn spun from PPS fiber, preliminarily wound up on an uncoiler 1, is fed with the aid of a feed roller 3 to a container 5 which contains a mixed liquid 4 composed of PTFE powder and a resol-type phenolic resin varnish. The mixed liquid 4 is coated on the surface of the reinforcing base 2, as the reinforcing base 2 is allowed to pass through the mixed liquid 4 retained in the container 5 with the aid of guide rollers 6 and 7 provided in the container 5. The reinforcing base 2 coated with the mixed liquid 4 is fed by a feed roller 8 to compression rolls 9 and 10, where the mixed liquid 4 coated on the surface of the reinforcing base 2 is allowed to impregnate deep into voids in the fiber texture by the compression rolls 9 and 10. In the process of vaporization of the solvent, in a drying oven 11, out from the reinforcing base 2 coated and impregnated with the mixed liquid 4, also a reaction of the resol-type phenolic resin varnish proceeds, and thereby a moldable prepreg (resin base) 12 for configuring the sliding contact surface-forming material is manufactured. FIG. 2 is a perspective view illustrating the square-cut prepreg 12 for configuring the sliding contact surface-forming material.

Solid content of the resol-type phenolic resin prepared by dissolving the resol-type phenolic resin into a volatile solvent is approximately 30 to 65% by weight of the whole resin varnish, viscosity of the resin varnish is preferably 800 to 5000 cP, and particularly preferably 1000 to 4000 cP.

<Flat Plate-Type Multi-Layered Sliding Contact Component>

Figure 3:
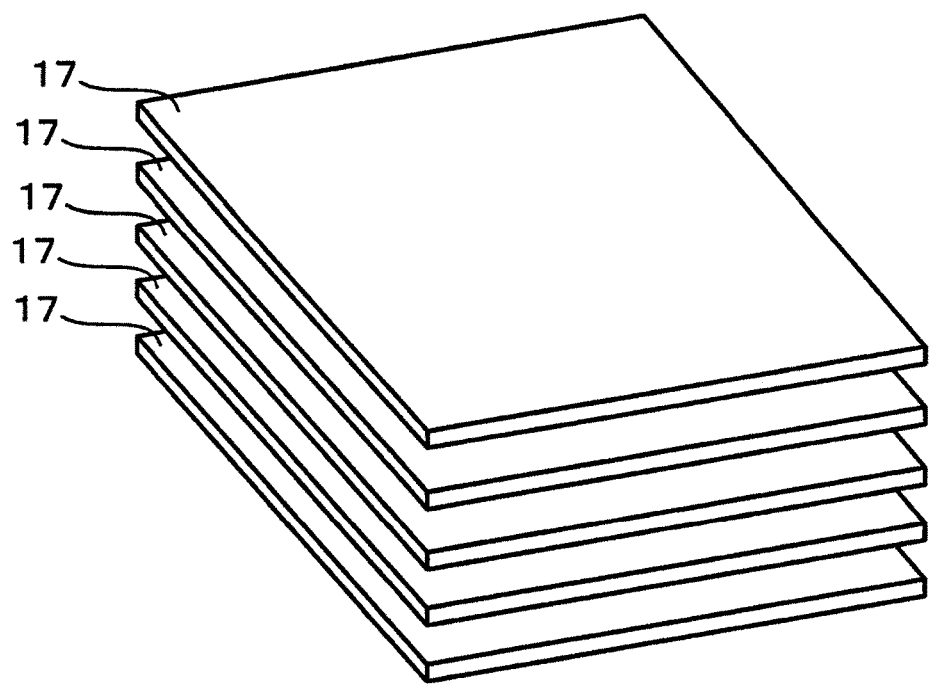
FIG. 3 is a perspective view illustrating resin bases (prepreg) composing a stack (metal backing)

A multi-layered sliding contact component 13 formed by using the prepreg 12 for configuring the sliding contact surface-forming material will be explained referring to FIG. 3 to FIG. 5. A metal backing 14 of the multi-layered sliding contact component 13 is manufactured using a manufacturing apparatus similar to that illustrated in FIG. 1 used in the method of manufacturing the prepreg 12 for configuring the sliding contact surface-forming material, and by a similar method of manufacturing. More specifically, a woven fabric 15 woven using an organic fiber or an inorganic fiber and wound up on the uncoiler 1 is fed with the aid of the feed roller 3 to the container 5 which contains a resol-type phenolic resin varnish 16, and allowed to pass through the resol-type phenolic resin varnish 16 contained in the container 5 with the aid of the guide rollers 6 and 7 provided in the container 5. The resin varnish is thus coated on the surface of the woven fabric 15. The woven fabric 15 coated with the resin varnish is then fed by the feed roller 8 to the compression rolls 9 and 10, where the resin varnish is impregnated into the woven fabric 15. In the process of vaporization of the solvent, in the drying oven 11, out from the woven fabric 15, also a reaction of the resin varnish proceeds, and thereby a moldable prepreg 17 for configuring the metal backing 14 is manufactured. FIG. 3 is a perspective view illustrating a plurality of square-cut prepregs 17 for configuring the metal backing 14.

Reinforcing fiber woven fabric adoptable to the metal backing 14 may be an inorganic fiber woven fabric such as glass fiber woven fabric, and carbon fiber woven fabric; or an organic fiber woven fabric such as aramid resin fiber woven fabric (copolyparaphenylene-3,4'-oxydiphenylene terephthalamide resin fiber woven fabric), each of which is appropriately selectable depending on applications of the multi-layered sliding contact component, proceeded under dry frictional conditions, underwater frictional conditions, boundary frictional conditions and so forth.

As illustrated in FIG. 3, a necessary number of sheets of the prepreg 17 for configuring the metal backing 14, having been square-cut so as to ensure a desired area, are prepared, where the number of sheets is determined so as to obtain a desired final thickness. On the other hand, at least one sheet of the prepreg 12 for configuring the sliding contact surface-forming material, having been square-cut similarly to the prepreg 17 for configuring the metal backing 14, is prepared. Next, as illustrated in FIG. 4, a predetermined number of sheets of prepreg 17 for configuring the metal backing 14 are stacked in a square recess 19 of a die 18 of a heat pressing machine, and the prepregs 12 for configuring the sliding contact surface-forming material are placed thereon. The stack is heated to 140 to 160° C. in the die 18, and pressed under a load of 4.9 to 7 MPa in the direction of stacking using a ram 20, to thereby obtain a square multi-layered mold. The stacked prepregs 12 for configuring the sliding contact surface-forming material and the prepregs 17 for configuring the metal backing 14 are bonded and fused with each other. The thus-obtained multi-layered mold is machined, to thereby give a flat plate-type multi-layered sliding contact component 13 illustrated in FIG. 5. The flat plate-type multi-layered sliding contact component 13 manufactured as described in the above has the metal backing 14 composed of a stack of inorganic fiber woven fabric or organic fiber woven fabric, and a slipping layer 21 composed of the prepreg 12 for configuring the sliding contact surface-forming material and integrally bonded to one surface of the metal backing 14. In the multi-layered sliding contact component 13, the slipping layer 21, which is composed of the prepreg 12 for configuring the sliding contact surface-forming material and is integrally bonded on the metal backing 14, is not only excellent in the friction-proof and wear-proof characteristics, but also improved in the load resistance. In addition, since the amount of swelling in moist atmosphere such as in oil or water is extremely small, so that the multi-layered sliding contact component 13 is adoptable to a wide variety of applications proceeded under dry frictional conditions, boundary frictional conditions, and water lubricating conditions.

<Circular Cylindrical Multi-Layered Sliding Contact Component>

Figure 6:
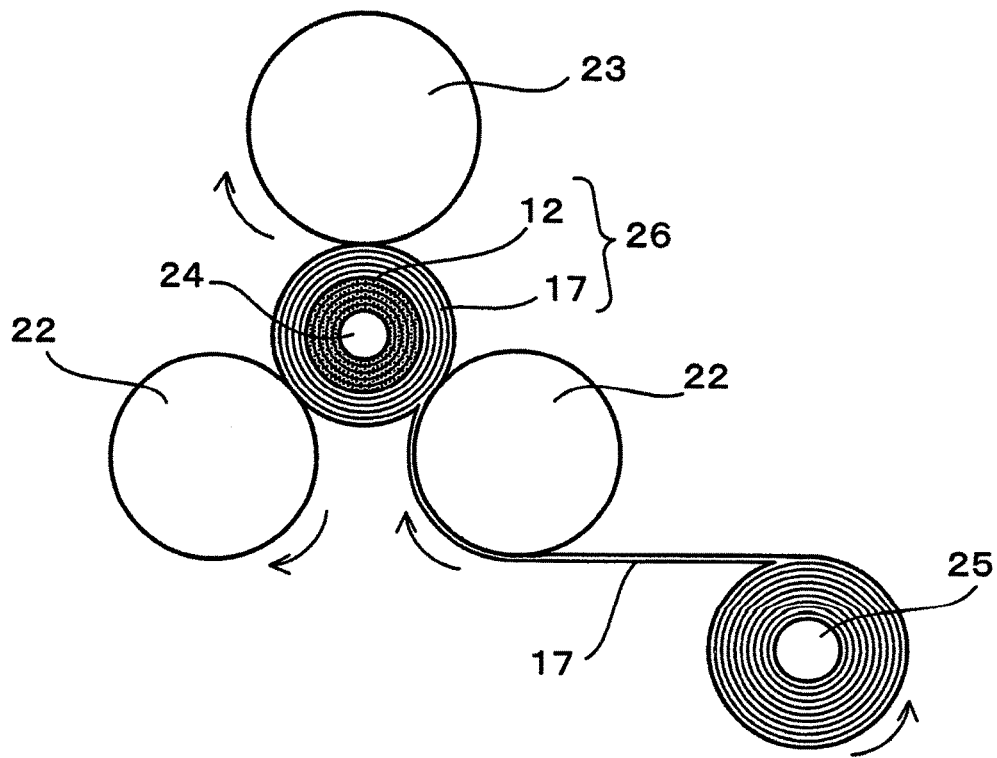
FIG. 6 is a drawing schematically illustrating an exemplary method of manufacturing a circular cylindrical multi-layered sliding contact component using the prepreg illustrated in FIG. 2.
Figure 7:
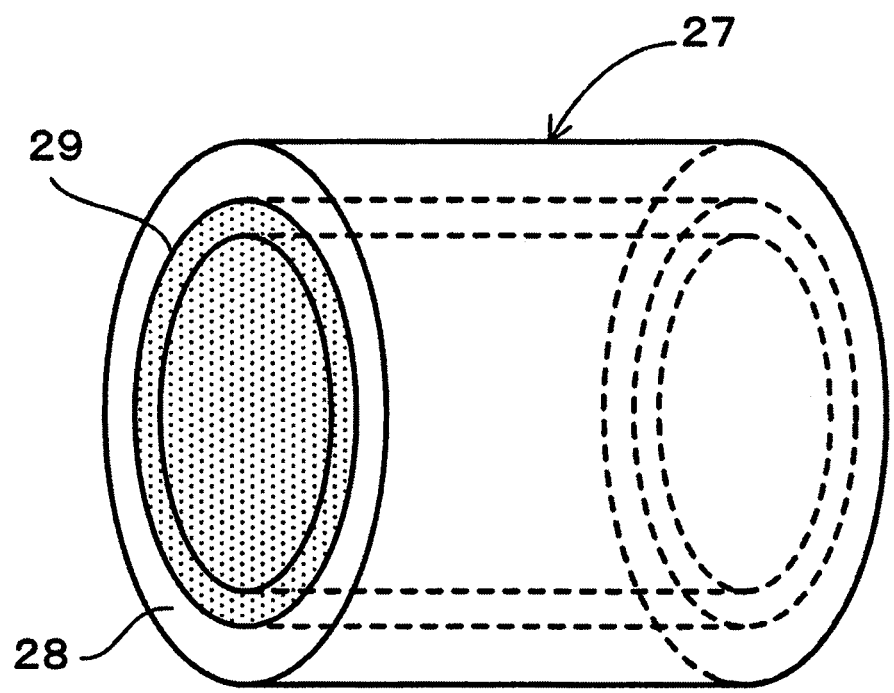
FIG. 7 is a perspective view illustrating the circular cylindrical multi-layered sliding contact component.

FIG. 6 and FIG. 7 are drawings illustrating an exemplary method of manufacturing of the circular cylindrical multi-layered sliding contact component, having the sliding contact surface-forming material integrally bonded to the sliding contact surface (inner circumferential surface). The circular cylindrical multi-layered sliding contact component may be manufactured by rolled forming using a rolled forming machine. A rolled forming machine illustrated in FIG. 6 generally has two heat rollers 22 and one pressure roller 23 respectively located at the apexes of triangle, and a core die 24 located at the center of the triangle, configured to form the circular cylindrical multi-layered sliding contact component while wrapping the prepreg 12 for configuring the sliding contact surface-forming material and the prepreg 17 for configuring the metal backing 14 around the core die 24 and rotating the core die 24 in one direction, under heating and pressurizing by the three rollers 22, 22 and 23.

In the rolled forming machine illustrated in FIG. 6, rolled forming is conducted so that the prepreg 12 for configuring the sliding contact surface-forming material, slit to a predetermined width, is wrapped at least one turn around the outer circumferential surface of the core die 24 preliminarily heated to 120 to 200° C., the prepreg 17 for configuring the metal backing 14 is fed further on the outer circumferential surface thereof from the feeding roll 25 via the heat rollers 22, 22 heated to 120 to 200° C., and then wound to a desired final thickness (outer diameter) under a pressure of 2 to 6 MPa with the aid of the pressure roller 23. The thus-molded circular cylindrical multi-layered mold 26, as held around the core die 24, is cured under heating in a heating oven conditioned at an ambient temperature of 20 to 180° C., then cooled, the core die 24 is drawn out, to thereby obtain the circular cylindrical multi-layered mold 26. Next, the thus-manufactured circular cylindrical multi-layered mold 26 is machined to form a circular cylindrical multi-layered sliding contact component 27 having a desired dimension as illustrated in FIG. 7. The thus-formed circular cylindrical multi-layered sliding contact component 27 has a slipping layer 29 composed of the sliding contact surface-forming material, which is integrally bonded to the inner circumferential surface of the circular cylindrical metal backing 28. The inner circumferential surface of the slipping layer 29 serves as the sliding contact surface. The circular cylindrical multi-layered sliding contact component 27 is excellent in the friction-proof and wear-proof characteristics, improved in the load resistance, causative of an extremely small amount of swelling when used in a moist atmosphere such as in oil or water, and is therefore applicable to a wide variety of applications proceeded under dry frictional (dry) conditions, boundary frictional conditions, and water lubricating conditions.

EXAMPLE

The present invention will be detailed below referring to Examples. It is to be understood that the present invention is not limited to Examples below, without departing from the spirit thereof.

<Flat Plate-Type Multi-Layered Sliding Contact Component>

Examples 1 to 3

(Reinforcing Base for Configuring Sliding Contact Surface-Forming Material)

A single twist yarn formed by lower-twisting (Z-twisting) at 280 T/m of a 400-denier spun yarn spun from PTFE fiber used as the fluorine-containing resin fiber, and a single twist yarn formed by lower-twisting (Z-twisting) at 280 T/m of a No. 20-cotton-count spun yarn spun from PPS fiber, were prepared. One each of the single twist yarns were paralleled, and these two single twist yarns were twisted at 275 T/m in the direction (S-direction) opposite to the direction (Z-direction) in which the single twist yarns were spun, to form a ply yarn. Using the ply yarn as the warp (vertical yarn) and the weft (horizontal yarn), a flat-woven fabric having a density of 40 ends/inch for the vertical yarn, and 40 picks/inch for the horizontal yarn was produced, and the fabric was used later as a reinforcing base.

(Resol-Type Phenolic Resin)

Into a separable flask equipped with a stirrer, a thermometer and a condenser tube, 300 g of bisphenol A and 192 g of a 37% aqueous formaldehyde solution were placed, 9 g of a 25% aqueous ammonia solution was added under stirring, the content was heated under normal pressure up to 90° C., and a condensation reaction was allowed to proceed for 2.5 hours. The content was then heated to 80° C. under a reduced pressure of 0.015 MPa for dehydration. The content was then added with 64 g of methanol, heated to 85° C. under normal pressure, a condensation reaction was allowed to proceed for 4 hours, the content was concentrated, diluted with methanol so as to adjust the resin solid content to 60% by weight, to thereby produce a resol-type phenolic resin (varnish with a solid content of 60% by weight). In Examples 1 to 3, the molar ratio of bisphenol A in the phenolic compound used herein was 100 mol %. By GPC measurement, the obtained resol-type phenolic resin was found to have a number-average molecular weight Mn of 900, and a dispersion index Mw/Mn of molecular weight distribution of 5.6.

A low-molecular-weight PTFE powder (from Kitamura Ltd. KTL-2N (trade name)) was used as PTFE, a predetermined amount of which for each Example was mixed with, and dispersed into the resol-type phenolic resin varnish, to thereby prepare a mixed liquid of the resol-type phenolic resin varnish and the low-molecular-weight PTFE powder.

(Prepreg for Configuring Sliding Contact Surface-Forming Material)

Now by using the manufacturing apparatus illustrated in FIG. 1, the reinforcing base 2, composed of a flat-woven fabric and preliminarily wound up on the uncoiler 1, was fed with the aid of the feed roller 3 to the container 5 which contains the mixed liquid 4. The mixed liquid 4 was coated on the surface of the reinforcing base 2, as the reinforcing base 2 was allowed to pass through the mixed liquid 4 retained in the container 5 with the aid of guide rollers 6 and 7 provided in the container 5. The reinforcing base 2 coated with the mixed liquid 4 was fed by the feed roller 8 to the compression rolls 9 and 10, where the mixed liquid 4 coated on the surface of the reinforcing base 2 was allowed to impregnate deep into voids in the fiber texture of the reinforcing base by the compression rolls 9 and 10. The reinforcing base 2 coated with the mixed liquid 4 was then fed to the drying oven 11, where the solvent was vaporized off, and the mixed liquid 4 was allowed to proceed a reaction, to thereby produce the prepregs for configuring the sliding contact surface-forming material of Examples 1 to 3, below:

(Example 1) reinforcing base (flat-woven fabric)=43.5% by weight, PTFE=13% by weight, and resol-type phenolic resin=43.5% by weight;

(Example 2) reinforcing base (ditto)=40.0% by weight, PTFE=20% by weight, and resol-type phenolic resin=40% by weight; and (Example 3) reinforcing base (ditto)=37.0% by weight, PTFE=26% by weight, and resol-type phenolic resin=37.0% by weight.

(Metal Backing)

A glass fiber flat-woven fabric, woven using a glass fiber single yarn spun from 100 single fibers (monofilaments) each having 5-μm diameter, and having a density of 65 ends/inch for the warp (vertical yarn) and a density of 65 picks/inch for the weft (horizontal yarn), was produced and used as the reinforcing fiber woven fabric. The resol-type phenolic resin (varnish with a solid content of 60% by weight) same as that described in the above was used as a thermosetting synthetic resin. Using the manufacturing apparatus illustrated in FIG. 1, the reinforcing fiber woven fabric (glass fiber flat-woven fabric) 15 preliminarily wound up on the uncoiler 1, was fed with the aid of the feed roller 3 to the container 5 which contains the resol-type phenolic resin varnish 16. The resol-type phenolic resin varnish 16 was coated on the surface of the reinforcing fiber woven fabric 15, as the flat-woven fabric 15 was allowed to pass through the resol-type phenolic resin varnish 16 retained in the container 5 with the aid of the guide rollers 6 and 7 provided in the container 5. The reinforcing fiber woven fabric 15 coated with the resol-type phenolic resin varnish 16 was fed by the feed roller 8 to the compression rolls 9 and 10, where the resin varnish was impregnated into the woven fabric 15 by the compression rolls 9 and 10, where the resol-type phenolic resin varnish 16 coated on the surface of the reinforcing fiber woven fabric 15 was allowed to impregnate deep into voids in the fiber texture of the reinforcing fiber woven fabric 15 by the compression rolls 9 and 10. The reinforcing fiber woven fabric 15 impregnated with the resol-type phenolic resin varnish 16 was then fed to the drying oven 11, where the solvent was vaporized off, and the resin varnish was allowed to proceed a reaction of the resol-type phenolic resin varnish 16, to thereby give the moldable prepregs 17 for configuring the metal backing, having a reinforcing fiber woven fabric content of 40% by weight, and a resol-type phenolic resin content of 60% by weight.

(Multi-Layered Sliding Contact Component)

Figure 4:
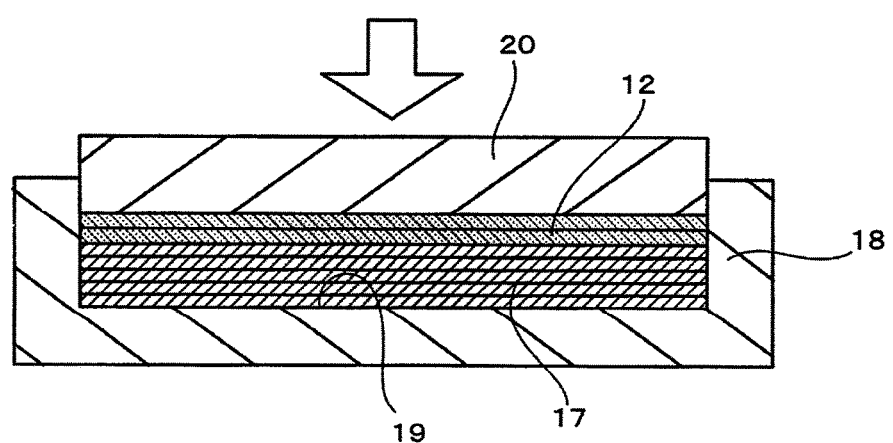
FIG. 4 is a drawing schematically illustrating an exemplary method of manufacturing the flat plate-type multi-layered sliding contact component using the prepreg illustrated in FIG. 2 and the prepreg illustrated in FIG. 3.
Figure 5:
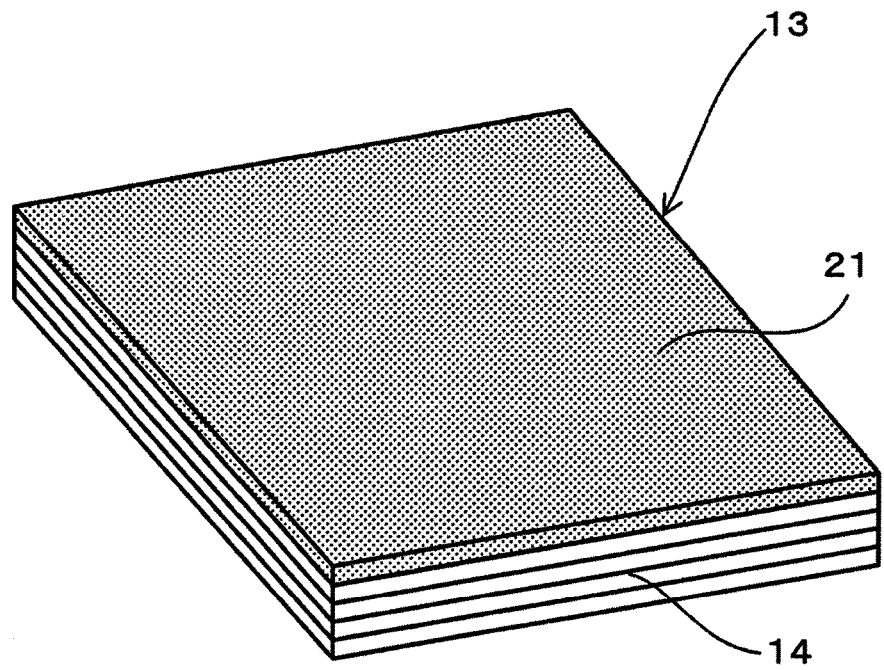
FIG. 5 is a schematic drawing illustrating a flat plate-type multi-layered sliding contact component.

The prepreg for configuring the metal backing was cut into 31-mm square sheets, and ten sheets were stacked in the square recess 19 of the die 18 of the heat pressing machine illustrated in FIG. 4. On the other hand, each of the prepregs for configuring the sliding contact surface-forming material, obtained in Example 1 to Example 3, was cut into 31-mm square sheets, and three of the sheets were stacked on the prepregs for configuring the metal backing preliminarily stacked in the recess 19 of the die, heated in the die 18 at 160° C. for 10 minutes, pressed in the direction of stacking at a pressure of 7 MPa, to thereby obtain a square multi-layered mold. The multi-layered mold was machined, to thereby give a flat plate-type multi-layered sliding contact component 13 having an edge length of 30 mm and a thickness of 5 mm, composed of the metal backing, and the slipping layer 21 composed of the sliding contact surface-forming material integrally bonded to the surface of the metal backing.

Examples 4 to 6

(Reinforcing Base for Configuring Sliding Contact Surface-Forming Material)

Single twist yarns formed by lower-twisting (Z-twisting) at 300 T/m of 400-denir spun yarn spun respectively from FEP fiber (Example 4), PFA fiber (Example 5), and ETFE fiber (Example 6) as the fluorine-containing resin fiber, and a single twist yarn formed by lower-twisting (Z-twisting) at 300 T/m of PPS fiber of No. 20 cotton count, were prepared. One each of the single twist yarns were paralleled, and then twisted (S-twisting) at 295 T/m in the direction (S-direction) opposite to the direction (Z-direction) in which the single twist yarns were spun, to form a ply yarn. Using the ply yarn as the warp (vertical yarn) and the weft (horizontal yarn), a flat-woven fabric having a density of 40 ends/inch for the warp and 40 picks/inch for the weft, was produced, and the fabric was used later as a reinforcing base.

(Resol-Type Phenolic Resin)

In a separable flask similar to that used in the above-described Examples, 160 g of bisphenol A and 79 g of a 37% aqueous formaldehyde solution were placed, 1.3 g of triethylamine was added under stirring, the content was heated under normal pressure, and allowed to proceed a condensation reaction under a reflux condition at 100° C. for one hour. The content was then cooled, and 32 g of phenol, 30 g of a 37% aqueous formaldehyde solution, and 0.3 g of triethylamine were added. The content was heated under normal pressure, and allowed to proceed a condensation reaction under a reflux condition at 100° C. for 2 hour, and then heated to 80° C. under a reduced pressure of 0.015 MPa for dehydration. The content was then added with 24 g of methanol, heated to 90° C. under normal pressure, a condensation reaction was allowed to proceed for 4 hours, the content was concentrated, diluted with methanol so as to adjust the resin solid content to 60% by weight, to thereby produce a resol-type phenolic resin (varnish with a solid content of 60% by weight). In Examples 4 to 6, the molar ratio of bisphenol A in the phenolic compound used herein was 67.4 mol %. By GPC measurement, the obtained resol-type phenolic resin was found to have a number-average molecular weight Mn of 720, and a dispersion index Mw/Mn of molecular weight distribution of 14.3.

A low-molecular-weight PTFE powder (same as that used in the above-described Example 1) was used as PTFE, a predetermined amount of which for each Example was mixed with, and dispersed into the resol-type phenolic resin varnish, to thereby prepare a mixed liquid of the resol-type phenolic resin varnish and the low-molecular-weight PTFE powder.

(Prepreg for Configuring Sliding Contact Surface-Forming Material)

Similarly to the above-described Example 1, using the manufacturing apparatus illustrated in FIG. 1, the reinforcing base 2 preliminarily wound up on the uncoiler 1, was fed with the aid of the feed roller 3 to the container 5 which contains the mixed liquid 4. The mixed liquid 4 was coated on the surface of the reinforcing base 2, as the reinforcing base 2 was allowed to pass through the mixed liquid 4 retained in the container 5 with the aid of the guide rollers 6 and 7 provided in the container 5. The reinforcing base 2 coated with the mixed liquid 4 was fed by the feed roller 8 to the compression rolls 9 and 10, where the mixed liquid 4 coated on the surface of the reinforcing base 2 was allowed to impregnate deep into voids in the fiber texture by the compression rolls 9 and 10. The reinforcing base 2 impregnated with the mixed liquid 4 was then fed to the drying oven 11, where the solvent was vaporized off, and the mixed liquid 4 was allowed to proceed a reaction, to thereby produce the prepregs for configuring the sliding contact surface-forming material of Examples 4 to 6, below:

(Example 4) reinforcing base (flat-woven fabric)=43.5% by weight, PTFE=13% by weight, and resol-type phenolic resin=43.5% by weight;

(Example 5) reinforcing base (ditto)=40.0% by weight, PTFE=20% by weight, and resol-type phenolic resin=40% by weight; and (Example 6) reinforcing base (ditto)=37.0% by weight, PTFE=26% by weight, and resol-type phenolic resin=37.0% by weight.

(Metal Backing)

The metal backing was manufactured by using the moldable prepreg for configuring the metal backing which contains 40% by weight of the reinforcing fiber woven fabric composed of glass fiber flat-woven fabric, and 60% by weight of the resol-type phenolic resin, which is the same as that used in the above-described Example 1.

(Multi-Layered Sliding Contact Component)

The multi-layered sliding contact component having an edge length of 30 mm and a thickness of 5 mm, composed of the metal backing, and the slipping layer composed of the sliding contact surface-forming material integrally bonded to the surface of the metal backing, was manufactured similarly as described in the aforementioned Example 1.

<Circular Cylindrical Multi-Layered Sliding Contact Component>

Examples 7 to 9

The prepregs for configuring the sliding contact surface-forming material same as those used in Examples 1 to 3 were respectively used, and the prepreg for configuring the metal backing same as that used in Example 1 was used. In the rolled forming machine illustrated in FIG. 6, rolled forming was conducted so that the prepreg for configuring the sliding contact surface-forming material, slit into 51-mm wide, was wrapped three turns around the outer circumferential surface of the core die 24 having an outer diameter of 60 mm and preliminarily heated to 150° C., the prepreg for configuring the metal backing was fed further on the outer circumferential surface thereof from the feeding roll 25 via the heat rollers 22 heated to 150° C., and then wound 15 turns under a pressure of 5 MPa with the aid of the pressure roller 23. The thus-molded circular cylindrical multi-layered mold 26, as held around the core die 24, was cured under heating in a heating oven conditioned at an ambient temperature of 150° C., then cooled, the core die 24 was drawn out, to thereby obtain the circular cylindrical multi-layered mold 26. Next, the thus-manufactured circular cylindrical multi-layered mold 26 was machined to form a circular cylindrical multi-layered sliding contact component 27 having an inner diameter of 60 mm, an outer diameter of 75 mm, and a length of 50 mm, as illustrated in FIG. 7.

Examples 10 to 12

The prepregs for configuring the sliding contact surface-forming material same as those used in Examples 4 to 6 were respectively used, and the prepreg for configuring the metal backing same as that used in Example 1 was used. In the rolled forming machine illustrated in FIG. 6, rolled forming was conducted so that the prepreg 12 for configuring the sliding contact surface-forming material, slit into 51-mm wide, was wrapped three turns around the outer circumferential surface of the core die 24 having an outer diameter of 60 mm and preliminarily heated to 150° C., the prepreg 17 for configuring the metal backing was fed further on the outer circumferential surface thereof from the feeding roll 25 via the heat rollers 22 heated to 150° C., and then wound 15 turns under a pressure of 5 MPa with the aid of the pressure roller 23. The thus-molded circular cylindrical multi-layered mold 26, as held around the core die 24, was cured under heating in a heating oven conditioned at an ambient temperature of 150° C., then cooled, the core die 24 was drawn out, to thereby obtain the circular cylindrical multi-layered mold 26. Next, the thus-manufactured circular cylindrical multi-layered mold 26 was machined to form a circular cylindrical multi-layered sliding contact component 27 having an inner diameter of 60 mm, an outer diameter of 75 mm, and a length of 50 mm, as illustrated in FIG. 7.

<Flat Plate-Type Multi-Layered Sliding Contact Component>

Comparative Examples 1 to 3

(Prepreg for Configuring Sliding Contact Surface-Forming Material)

The reinforcing base used herein was a flat-woven fabric which was woven by using a polyester spun yarn of No. 20 cotton count as the warp and the weft, with a density of 43 ends/inch for the warp, and a density of 42 picks/inch for the weft. By using the resol-type phenolic resin containing, dispersed therein, the low-molecular-weight PTFE powder same as that described in Examples 1 to 3, the prepregs for configuring the sliding contact surface-forming material of Comparative Examples 1 to 3 were produced similarly as described in Example 1.

(Comparative Example 1) reinforcing base (flat-woven fabric)=43.5% by weight, PTFE=13% by weight, and resol-type phenolic resin=43.5% by weight;

(Comparative Example 2) reinforcing base (ditto)=40.0% by weight, PTFE=20% by weight, and resol-type phenolic resin=40% by weight; and (Comparative Example 3) reinforcing base (ditto)=37.0% by weight, PTFE=26% by weight, and resol-type phenolic resin=37.0% by weight.

(Metal Backing)

The moldable prepreg for configuring the metal backing, which contains 40% by weight of the reinforcing fiber woven fabric composed of glass fiber flat-woven fabric, and 60% by weight of the resol-type phenolic resin, which is the same as that used in Example 1, was used.

(Multi-Layered Sliding Contact Component)

The prepreg for configuring the metal backing was cut into 31-mm square sheets, and ten sheets were stacked in the square recess 19 of the die 18 of the heat pressing machine illustrated in FIG. 4. On the other hand, the prepregs for configuring the sliding contact surface-forming material, obtained in Comparative Examples 1 to 3 was cut into 31-mm square sheets, and three of the sheets were stacked on the prepregs 17 for configuring the metal backing preliminarily stacked in the recess 19 of the die, heated in the die 18 at 160° C. for 10 minutes, pressed in the direction of stacking at a pressure of 7 MPa, to thereby obtain a square multi-layered mold. The mold was machined, to thereby give a multi-layered sliding contact component 13 having an edge length of 30 mm and a thickness of 5 mm, composed of the metal backing 14, and the slipping layer 21 composed of the sliding contact surface-forming material integrally bonded to the surface of the metal backing 14.

<Circular Cylindrical Multi-Layered Sliding Contact Component>

Comparative Examples 4 to 6

(Prepreg for Configuring Sliding Contact Surface-Forming Material)

The prepregs for composing the sliding contact surface-forming material, same as those used in Comparative Examples 1 to 3, were used.

(Metal Backing)

The moldable prepreg for configuring the metal backing, which contains 40% by weight of the reinforcing fiber woven fabric composed of glass fiber flat-woven fabric, and 60% by weight of the resol-type phenolic resin, which is the same as that used in Example 1, was used.
(Multi-Layered Sliding Contact Component)

In the rolled forming machine illustrated in FIG. 6, rolled forming was conducted so that the prepreg 12 for configuring the sliding contact surface-forming material, slit into 51-mm wide, was wrapped three turns around the outer circumferential surface of the core die 24 having an outer diameter of 60 mm and preliminarily heated to 150° C., the prepreg 17 for configuring the metal backing was fed further on the outer circumferential surface thereof from the feeding roll 25 via the heat rollers 22 heated to 150° C., and then wound 15 turns under a pressure of 5 MPa with the aid of the pressure roller 23. The thus-molded circular cylindrical multi-layered mold 26, as held around the core die 24, was cured under heating in a heating oven conditioned at an ambient temperature of 150° C., then cooled, the core die 24 was drawn out, to thereby obtain the circular cylindrical multi-layered mold 26. Next, the thus-manufactured circular cylindrical multi-layered mold 26 was machined to form a circular cylindrical multi-layered sliding contact component 27 having an inner diameter of 60 mm, an outer diameter of 75 mm, and a length of 50 mm, as illustrated in FIG. 7.

Next, results of experiments on the friction-proof and wear-proof characteristics, and the amount of swelling (%) in water, of the multi-layered sliding contact components obtained in Examples and Comparative Examples will be explained.

Friction-Proof and Wear-Proof Characteristics of Flat Plate-Type Multi-Layered Sliding Contact Component in Examples 1 to 6 and Comparative Examples 1 to 3
(1) Thrust Bearing Test The friction coefficient and amount of wear were measured according to the test conditions listed in Table 1. The amount of wear was represented by the amount of dimensional change observed after the 30-hour testing.

TABLE 1

Figure 8:
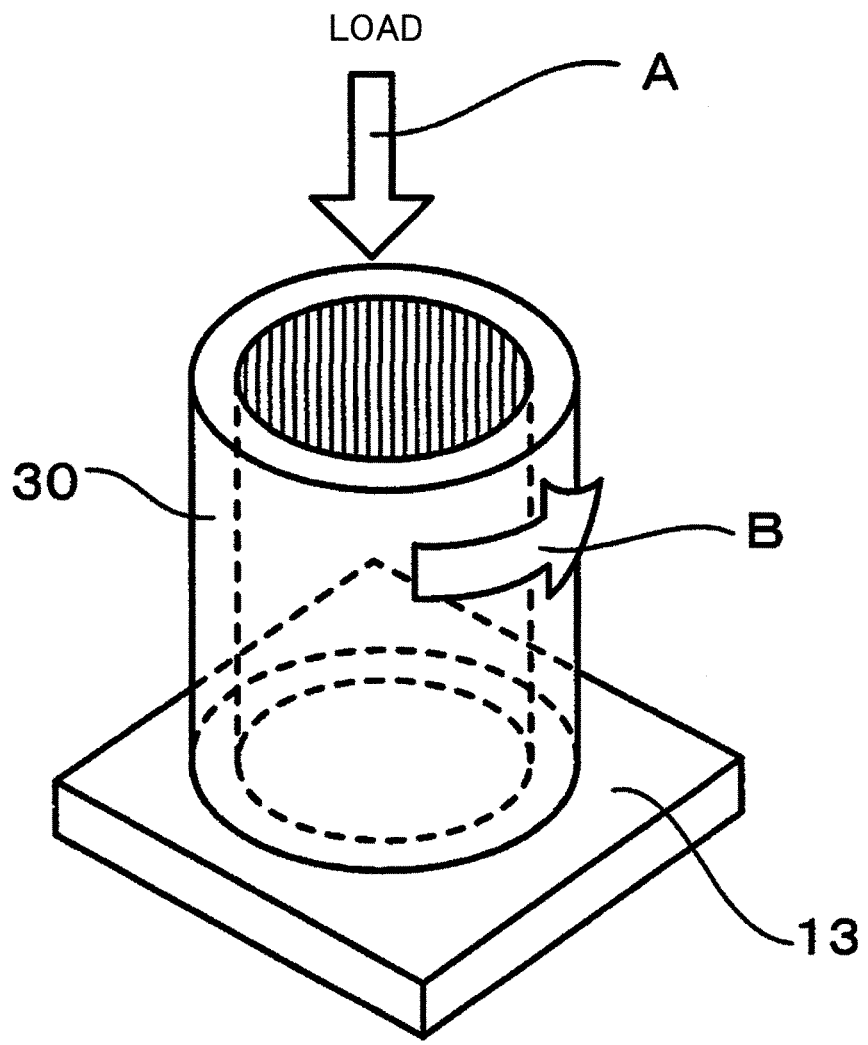
FIG. 8 is a perspective view illustrating a method of thrust bearing test.

| Surface pressure | 29.4 MPa (300 kgf/cm$^2$) |
|---|---|
| Sliding velocity | 2 m/min |
| Test period | 30 hours |
| Material of opposing member | austenitic stainless steel (SUS304) |
| Environment/Atmosphere | air |
| Lubrication | (1) none (dry) |
| | (2) greased on sliding contact surface |
| Test method | As illustrated in FIG. 8, a flat plate-type bearing test piece (multi-layered sliding contact component) 13 was fixed, an opposing circular cylinder 30 was allowed to rotate in the direction of arrow B, on the flat plate-type bearing test piece 13 (from the direction of arrow "A") while applying a predetermined load to the surface thereof, and the friction coefficient between the flat plate-type bearing test piece 13 and the circular cylinder 30, and the amount the wear (mm) of the flat plate-type bearing test piece 13 after the elapse of 30 hours were measured. |

TABLE 1-continued

Friction-Proof and Wear-Proof Characteristics of Circular Cylindrical Multi-Layered Sliding Contact Components in Examples 7 to 12 and Comparative Examples 4 to 6
(1) Oscillating Test for Journal The friction coefficient and amount of wear were measured according to the test conditions listed in Tables 2 and 3. The amount of wear was represented by the amount of dimensional change observed after the 100-hour testing.

TABLE 2

Figure 9:
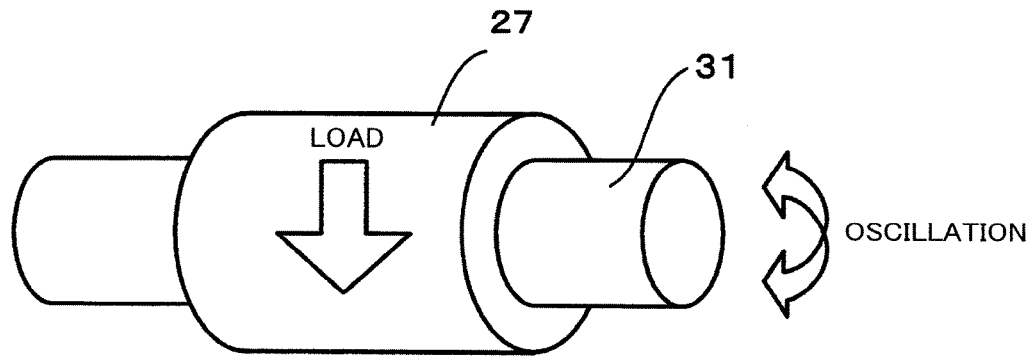
FIG. 9 is a perspective view illustrating a method of testing journal under oscillating conditions.

| Surface pressure | 29.4N/mm$^2$ (300 kgf/cm$^2$) |
|---|---|
| Sliding velocity | 0.008 m/s (0.50 m/min) |
| Oscillation speed | 120 cpm |
| Oscillation angle | 4° (±2°) |
| Environment/Atmosphere | (1) in air |
| | (2) in clean water |
| Lubrication | none |
| Test method | As illustrated in FIG. 9, a circular cylindrical bearing test piece (circular cylindrical multi-layered sliding contact component) 27 was fixed under load, an opposing rotating shaft 31 was allowed to rotate under oscillation at a constant sliding velocity, then the friction coefficient between the circular cylindrical bearing test piece 27 and the rotating shaft 31, and the amount of wear on the inner circumferential surface (sliding contact surface) of the circular cylindrical bearing test piece 27 after the elapse of 100 hours were measured. |

TABLE 3

| Surface pressure | 29.4N/mm$^2$ (250 kgf/cm$^2$) |
|---|---|
| Sliding velocity | 0.012 m/s (1.13 m/min) |
| Oscillation speed | 12 cpm |
| Oscillation angle | 90° (±45°) |
| Environment/Atmosphere | in air |
| Lubrication | none |
| Test method | Same as the test method described in Table 2. |

Results of test on friction and wear are shown in Table 4 to Table 6. In Table 4 to Table 6, the number-average molecular weight Mn and dispersion index Mw/Mn of the resol-type phenolic resin were measured by GPC, and the values were estimated based on a standard curve prepared by using polystyrene as a standard substance. Measurement instruments are as follow:
GPC analyzer: HLC-8120 from Tosoh Corporation;
Column: TSK gel G3000HXL [exclusion limit molecular weight (polystyrene-based) 1×10$^3$]×1, followed by TSK gel G2000HXL [exclusion limit molecular weight (polystyrene-based) 1×10$^4$]×2, from Tosoh Corporation; and
Detector: UV-8020 from Tosoh Corporation

TABLE 4

| Flat plate-type | | Example | | | | | |
|---|---|---|---|---|---|---|---|
| multi-layered sliding contact component | | 1 | 2 | 3 | 4 | 5 | 6 |
| Sliding contact surface-forming material | Flat-woven fabric (fluorine-containing resin fiber and PPS fiber) | 43.5 | 40 PTFE | 37 | 43.5 FEP | 40 PFA | 37 ETFE |
| | PTFE | 13 | 20 | 26 | 13 | 20 | 26 |
| | Resol-type phenolic resin | 43.5 | 40 | 37 | 43.5 | 40 | 37 |
| Ratio of bisphenol A (mol %) | | | 100 | | | 67.4 | |

TABLE 4-continued

| Flat plate-type multi-layered sliding contact component | | | Example | | | | | |
|---|---|---|---|---|---|---|---|---|
| | | | 1 | 2 | 3 | 4 | 5 | 6 |
| Molecular weight Mn | | | | 900 | | | 720 | |
| Dispersion Mw/Mn | | | | 5.6 | | | 14.3 | |
| Friction-proof, wear-proof characteristics | Thrust bearing test Lubrication (dry) | Friction coefficient | 0.10 | 0.08 | 0.08 | 0.11 | 0.09 | 0.10 |
| | | Amount of wear | 0.08 | 0.06 | 0.09 | 0.08 | 0.09 | 0.09 |
| | Thrust bearing test Lubrication (greased) | Friction coefficient | 0.07 | 0.06 | 0.08 | 0.06 | 0.07 | 0.07 |
| | | Amount of wear | 0.04 | 0.03 | 0.04 | 0.05 | 0.05 | 0.06 |
| Amount of swelling | Rate of change in length (%) | | 0.12 | 0.10 | 0.12 | 0.13 | 0.12 | 0.13 |
| | Rate of change in thickness (%) | | 0.40 | 0.38 | 0.42 | 0.42 | 0.40 | 0.41 |

TABLE 5

| Flat plate-type multi-layered sliding contact component | | | Comparative Example | | |
|---|---|---|---|---|---|
| | | | 1 | 2 | 3 |
| Sliding contact surface-forming material | Flat-woven fabric (polyester fiber) | | 43.5 | 40 | 37 |
| | PTFE | | 13 | 20 | 26 |
| | Resol-type phenolic resin | | 43.5 | 40 | 37 |
| Ratio of bisphenol A (mol %) | | | | 100 | |
| Molecular weight Mn | | | | 900 | |
| Dispersion Mw/Mn | | | | 5.6 | |
| Friction-proof, wear-proof characteristics | Thrust bearing test Lubrication (dry) | Friction coefficient | 0.13 | 0.12 | 0.10 |
| | | Amount of wear | 0.08 | 0.09 | 0.10 |
| | Thrust bearing test Lubrication (greased) | Friction coefficient | 0.08 | 0.06 | 0.07 |
| | | Amount of wear | 0.03 | 0.03 | 0.04 |
| Amount of swelling | Rate of change in length (%) | | 0.14 | 0.12 | 0.13 |
| | Rate of change in thickness (%) | | 0.46 | 0.44 | 0.45 |

TABLE 6

| Circular cylindrical multi-layered sliding contact component | | | Example | | | | | |
|---|---|---|---|---|---|---|---|---|
| | | | 7 | 8 | 9 | 10 | 11 | 12 |
| Sliding contact surface-forming material | Flat-woven fabric (fluorine-containing resin fiber and PPS fiber) | | 43.5 | 40 | 37 | 43.5 | 40 | 37 |
| | | | | PTFE | | FEP | PFA | ETFE |
| | PTFE | | 13 | 20 | 26 | 13 | 20 | 26 |
| | Resol-type phenolic resin | | 43.5 | 40 | 37 | 43.5 | 40 | 37 |
| Ratio of bisphenol A (mol %) | | | | 100 | | | 67.4 | |
| Molecular weight Mn | | | | 900 | | | 720 | |
| Dispersion Mw/Mn | | | | 5.6 | | | 14.3 | |
| Friction-proof, wear-proof characteristics | Oscillation test for journal (in air: angle of oscillation = 4°) | Friction coefficient | 0.10 | 0.08 | 0.09 | 0.08 | 0.08 | 0.08 |
| | | Amount of wear | 0.05 | 0.09 | 0.10 | 0.03 | 0.03 | 0.03 |
| | Oscillation test for journal (in clean water: angle of oscillation = 4°) | Friction coefficient | 0.08 | 0.08 | 0.08 | 0.08 | 0.08 | 0.09 |
| | | Amount of wear | 0.01 | 0.01 | 0.01 | 0.02 | 0.02 | 0.03 |
| | Oscillation test for journal (in air: angle of oscillation = 90°) | Friction coefficient | 0.10 | 0.10 | 0.12 | 0.14 | 0.15 | 0.15 |
| | | Amount of wear | 0.08 | 0.08 | 0.10 | 0.15 | 0.15 | 0.16 |
| Amount of swelling | Rate of change in inner diameter (%) | | 0.12 | 0.13 | 0.14 | 0.12 | 0.14 | 0.13 |
| | Rate of change in outer diameter (%) | | 0.28 | 0.30 | 0.32 | 0.28 | 0.32 | 0.30 |
| | Rate of change in length (%) | | 0.18 | 0.20 | 0.22 | 0.20 | 0.19 | 0.22 |

TABLE 7

| Circular cylindrical multi-layered sliding contact component | | | Comparative Example | | |
|---|---|---|---|---|---|
| | | | 4 | 5 | 6 |
| Sliding contact surface-forming material | Flat-woven fabric (polyester fiber) | | 43.5 | 40 | 37 |
| | PTFE | | 13 | 20 | 26 |
| | Resol-type phenolic resin | | 43.5 | 40 | 37 |
| Ratio of bisphenol A (mol %) | | | 100 | | |
| Molecular weight Mn | | | 900 | | |
| Dispersion Mw/Mn | | | 5.6 | | |
| Friction-proof, wear-proof characteristics | Oscillation test for journal (in air: angle of oscillation = 4°) | Friction coefficient | 0.11 | 0.12 | 0.10 |
| | | Amount of wear | 0.05 | 0.09 | 0.10 |
| | Oscillation test for journal (in clean water: angle of oscillation = 4°) | Friction coefficient | 0.08 | 0.06 | 0.07 |
| | | Amount of wear | 0.03 | 0.03 | 0.04 |
| | Oscillation test for journal (in air: angle of oscillation = 90°) | Friction coefficient | 0.14 | 0.12 | 0.12 |
| | | Amount of wear | 0.61 | 0.65 | 0.72 |
| Amount of swelling | Rate of change in inner diameter (%) | | 0.12 | 0.13 | 0.13 |
| | Rate of change in outer diameter (%) | | 0.28 | 0.30 | 0.30 |
| | Rate of change in length (%) | | 0.25 | 0.28 | 0.26 |

The molar ratio of bisphenol A shown in Table 4 to Table 7 were calculated by the equation below:

molar ratio=(molarity of bisphenol A as charged/total molarity of phenolic compounds as charged)× 100 (mol %).

It is understood from the test results, particularly from comparison of the friction-proof and wear-proof characteristics under journal oscillating conditions shown in Table 6 and Table 7, that the multi-layered sliding contact components of Examples 7 to 12 were found to show smaller friction coefficients and improved wear resistance, as compared with the conventional multi-layered sliding contact components of Comparative Examples 4 to 6. In particular in the test at an angle of oscillation of journal of 90° (±45°, the multi-layered sliding contact components of Examples 7 to 12 were found to be largely improved in the wear resistance, as compared with the conventional multi-layered sliding contact components of Comparative Examples 4 to 6. The multi-layered sliding contact components in Examples and Comparative Examples showed almost equivalent amounts of swelling.

INDUSTRIAL APPLICABILITY

As described in the above, the woven fabric as the reinforcing base, which configures the sliding contact surface-forming material of the present invention, and is composed of a woven fabric formed by using, respectively as the warp and the weft, a ply yarn formed by paralleling at least two strands of a single twist yarn spun from fluorine-containing resin fiber and a single twist yarn spun from PPS fiber, and by twisting them in the direction opposite to the direction in which the single twist yarns were spun, allows the fluorine-containing resin fiber and the PPS fiber to expose on at least one surface thereof which serves as the sliding contact surface, while keeping almost equal areas of exposure. The present invention therefore successfully provides a sliding contact surface-forming material, improved in the friction-proof and wear-proof characteristics contributed by low friction properties of the PTFE powder impregnated into the woven fabric. The multi-layered sliding contact component, which has such sliding contact surface-forming material so as to configure the sliding contact surface, has excellent friction-proof and wear-proof characteristics, high rigidity, and excellent mechanical strength. In addition, since the multi-layered sliding contact component shows an extremely small amount of swelling in moist atmosphere such as underwater, so that dimensional changes ascribable the swelling will be extremely small, and this makes the component adoptable to a wide variety of applications proceeded under dry frictional (dry) conditions, grease lubricating conditions, and water lubricating conditions.

EXPLANATION OF THE MARKS 2 reinforcing base
12 prepreg for configuring the sliding contact surface-forming material
13 flatplate-type multi-layered sliding contact component
14 metal backing
17 prepreg for configuring the metal backing
21 slipping layer
27 circular cylindrical multi-layered sliding contact component

The invention claimed is:

1. A sliding contact surface-forming material comprising a reinforcing base impregnated with a resol phenolic resin having polytetrafluoroethylene resin dispersed therein,
   the reinforcing base comprising a woven fabric formed by using, respectively as each of the warp and the weft, a ply yarn which is formed by paralleling exactly two strands of:
   a single twist yarn spun from fluorine-containing resin fiber, and
   a single twist yarn spun from polyphenylene sulfide fiber, and by twisting them in a direction opposite to the direction in which the single twist yarns were spun;
   wherein the single twist yarn spun from fluorine-containing resin fiber is a yarn of at least 400 denier,
   wherein the single twist yarn spun from polyphenylene sulfide fiber is a yarn having at least No. 20 cotton count,
   wherein the reinforcing base is a flat-woven fabric having a density of 36 to 44 ends/inch for the warp (vertical yarn), and 36 to 44 picks/inch for the weft (horizontal yarn),
   wherein the sliding contact surface-forming material is configured for use in a moist environment, and is further configured so that the fluorine-containing resin fiber and the polyphenylene sulfide fiber are both exposed on at least one surface thereof which serves as the sliding contact surface, while keeping substantially equal areas of exposure of the fluorine-containing resin fiber and the polyphenylene sulfide fiber on the sliding contact surface,
   wherein the sliding contact surface-forming material contains 37 to 43.5% by weight of the resol-type phenolic resin, 13 to 26% by weight of the polytetrafluoroethylene resin, and 37 to 43.5% by weight of the reinforcing base.

2. The sliding contact surface-forming material according to claim 1, wherein the fluorine-containing resin fiber is selected from polytetrafluoroethylene fiber, tetrafluoroethylene-perfluoroalkyl vinyl ether copolymer fiber, tetrafluoroethylene-hexafluoropropylene copolymer fiber and ethylene-tetrafluoroethylene copolymer fiber.

3. The sliding contact surface-forming material according to claim 1, wherein the single twist yarns are lower-twisted (Z-twisted) yarns.

4. The sliding contact surface-forming material according to claim 1, wherein each single twist yarn has a twist count of 260 to 300 T/m.

5. The sliding contact surface-forming material according to claim 1, wherein the ply yarn has a twist count of 255 to 295 T/m.

6. The sliding contact surface-forming material according to claim 1, wherein the resol phenolic resin is synthesized by allowing a phenolic compound which contains 50 to 100 mol % of bisphenol A to react with a formaldehyde compound, while being catalyzed by an amine compound, has a number-average molecular weight Mn, measured by gel permeation chromatography, of 500 to 1000, and has a dispersion index Mw/Mn, given as a ratio of weight-average molecular weight Mw and number-average molecular weight Mn, of 2.5 to 15.

7. The sliding contact surface-forming material according to to claim 1, wherein the polytetrafluoroethylene resin is either of a high-molecular-weight polytetrafluoroethylene resin or a low-molecular-weight polytetrafluoroethylene resin.

8. A multi-layered sliding contact component having the overall shape of a flat plate, and having the sliding contact surface-forming material described in claim 7, so as to configure at least the sliding-contact surface thereof.

9. A multi-layered sliding contact component having the overall shape of a circular cylinder, and having the sliding contact surface-forming material described in claim 1 so as to configure at least the sliding-contact surface thereof.

10. A sliding contact surface-forming material comprising a reinforcing base impregnated with a resol phenolic resin having polytetrafluoroethylene resin dispersed therein,
the reinforcing base comprising a woven fabric formed by using a ply yarn as each of the warp and the weft, respectively, said ply yarn formed by paralleling exactly_two strands of:
a Z-twisted single twist yarn spun from fluorine-containing resin fiber selected from the group consisting of polytetrafluoroethylene fiber, tetrafluoroethylene-perfluoroalkyl vinyl ether copolymer fiber, tetrafluoroethylene-hexafluoropropylene copolymer fiber, and ethylene-tetrafluoroethylene copolymer fiber, and
a Z-twisted single twist yarn spun from polyphenylene sulfide fiber,
and by twisting them in an S-twist in a direction opposite to the direction in which the single twist yarns were spun;
wherein the single twist yarn spun from fluorine-containing resin fiber is a yarn of at least 400 denier,
wherein the single twist yarn spun from polyphenylene sulfide fiber is a yarn having at least No. 20 cotton count,
wherein the reinforcing base is a flat-woven fabric having a density of 36 to 44 ends/inch for the warp (vertical yarn), and 36 to 44 picks/inch for the weft (horizontal yarn),
wherein the sliding contact surface-forming material is configured for use in a moist environment, and is further configured so that the fluorine-containing resin fiber and the polyphenylene sulfide fiber are both exposed on at least one surface thereof which serves as the sliding contact surface, while keeping substantially equal areas of exposure of the fluorine-containing resin fiber and the polyphenylene sulfide fiber on the sliding contact surface, and
wherein the sliding contact surface-forming material contains 37 to 43.5% by weight of the resol-type phenolic resin, 13 to 26% by weight of the polytetrafluoroethylene resin, and 37 to 43.5% by weight of the reinforcing base.

11. The sliding contact surface-forming material according to claim 10, wherein each single twist yarn has a twist count of 260 to 300 T/m.

12. The sliding contact surface-forming material according to claim 10, wherein the ply yarn has a twist count of 255 to 295 T/m.

13. A sliding contact surface-forming material consisting of a reinforcing base impregnated with a resol phenolic resin having polytetrafluoroethylene resin dispersed therein, the resol phenolic resin making up about 37 to 43.5% by weight, the polytetrafluoroethylene resin making up about 13-26% by weight, and the reinforcing base making up about 37 to 43.5% by weight of the total weight of the surface-forming material;
the reinforcing base consisting of a woven fabric formed by using a ply yarn as each of the warp and the weft, respectively, said ply yarn formed by paralleling exactly two strands of:
a Z-twisted single twist yarn spun from fluorine-containing resin fiber selected from the group consisting of polytetrafluoroethylene fiber, tetrafluoroethylene-perfluoroalkyl vinyl ether copolymer fiber, tetrafluoroethylene-hexafluoropropylene copolymer fiber, and ethylene-tetrafluoroethylene copolymer fiber, and
a Z-twisted single twist yarn spun from polyphenylene sulfide fiber,
and by twisting them in an S-twist in a direction opposite to the direction in which the single twist yarns were spun,
wherein the single twist yarn spun from fluorine-containing resin fiber is a yarn of at least 400 denier,
wherein the single twist yarn spun from polyphenylene sulfide fiber is a yarn having at least No. 20 cotton count,
wherein the sliding contact surface-forming material is configured for use in a moist environment, and is further configured so that the fluorine-containing resin fiber and the polyphenylene sulfide fiber are both exposed on at least one surface thereof which serves as the sliding contact surface, while keeping substantially equal areas of exposure of the fluorine-containing resin fiber and the polyphenylene sulfide fiber on the sliding contact surface, and
wherein the reinforcing base is a flat-woven fabric having a density of 36 to 44 ends/inch for the warp (vertical yarn), and 36 to 44 picks/inch for the weft (horizontal yarn).

* * * * *